UNITED STATES PATENT OFFICE.

PAUL ALEXANDER, OF CHARLOTTENBURG, GERMANY.

DISSOLVING AND REGENERATING RUBBER.

No. 821,394.

Specification of Letters Patent.

Patented May 22, 1906.

Application filed August 10, 1905. Serial No. 273,644.

*To all whom it may concern:*

Be it known that I, PAUL ALEXANDER, doctor of philosophy and chemist, a subject of the German Emperor, and a resident of Charlottenburg, in the Kingdom of Prussia, German Empire, have invented new and useful improvements in processes for the production of aqueous caoutchouc solutions and for the regeneration of rubber waste, of which the following is a full, clear, and exact specification.

It is generally known that caoutchouc, gutta-percha, and similar products occur in nature in the form of so-called "milky saps." Milky saps are aqueous liquids which contain liquid bodies insoluble in water in an exceedingly fine state of subdivision. Whether caoutchouc is contained as such in the milky saps of the plants or whether during the coagulation a change of the original substances contained in the milky saps takes place is still an open question.

I have succeeded in converting not only raw caoutchouc, but also vulcanized caoutchouc material into a condition similar to caoutchouc-milk. This can be effected by dissolving raw or vulcanized caoutchouc in any one of the known solvents, such as hydrocarbons and the like, and then treating the solution of raw or vulcanized caoutchouc with a strong alkaline liquid under pressure and stirring. The originally-liquid-caoutchouc solution is thereby converted into a gelatinous condition. If now a solution thus treated be exposed to the action of a current of steam, the caoutchouc solvent distils off with the excess of steam, while the water condensing in the receptacle takes up the caoutchouc material in forming an aqueous solution. The solutions thus obtained are as regards the condition of the caoutchouc material probably not identical with the natural caoutchouc-milk. They give the impression of colloidal solutions, can be easily filtered, and can be easily and perfectly freed from mechanical impurities by filtering or by subsidence. By several subsequent filtrations it is possible to get solutions as clear as water. By the addition of acids the caoutchouc substance is again separated from the solutions and can then be easily washed and brought into a useful condition. My solutions offer as compared with ordinary caoutchouc solutions the advantage that they can be easily filtered. Thus, for example, a caoutchouc solution in benzene can only be separated mechanically from coarse impurities, finely-divided mineral admixtures not being capable of separation from these strongly-viscous solutions, either by filtration or by subsidence. In consequence hereof solutions containing a large amount of mineral matters are not only used in caoutchouc manufactures, but are also brought into commerce as such, as even after long storage no deposit of the mineral substances takes place.

In addition my solutions contain the caoutchouc in a very fine state of subdivision and the products precipitated therefrom show a very different physical condition, more favorable to the practical application thereof than the products obtained from ordinary caoutchouc solutions after removal of the solvent. My solutions can therefore receive a many-sided application in all cases where it is of importance to mix caoutchouc in a very fine state of subdivision with other media—as, for example, for impregnating fabrics. Of very special advantage is the use of such solutions in the purification of the raw caoutchouc and in the regeneration of rubber waste. In particular in the latter case the possibility of the complete or almost complete removal of the mineral constituents is of very great importance, for while a regenerated caoutchouc, which—as, for instance, in the American kinds—never contains less than thirty (30) per cent. of mineral constituents, can of course not be employed to any extent for good specifically light mixtures this can be easily done with a product which only contains a few percents or only a fraction of a per cent. of mineral matters. By the above-described process light products which only contain fractions of a per cent. of mineral matters can be obtained from the specifically heaviest substances.

The following example will explain the process: One thousand (1,000) kilos of caoutchouc waste are heated to one hundred and fifty (150°) degrees centigrade, together with three thousand (3,000) kilos of benzene, during from three (3) to four (4) hours in a closed vessel under pressure. The undissolved constituents are then mechanically removed. The solution is returned to the pressure vessel and is heated to one hundred and fifty (150°) degrees centigrade for some time—say three (3) hours—with two hundred (200) kilos of sodium hydrate in three hundred and fifty (350) kilos of water. The solution is then introduced into a retort and is treated with steam so long as benzene passes off. The steam distillation must be conducted in such manner that a considerable portion of steam condenses in the vessel. The aqueous solution thus produced is filtered or separated by subsidence from mechanical impurities. If it is desired to separate the caoutchouc material from this solution, which can be used for the above purposes, it is precipitated by the addition of acid or by combustion gases.

Solutions of caoutchouc in an aqueous alkaline solvent were not known heretofore, and there is consequently no recognized theory by which the transfer of the caoutchouc from the hydrocarbon solvent to the alkaline aqueous solvent can be explained. It is believed, however, that during the process first a combination of the alkali with the caoutchouc is formed which has the property of being soluble in water.

The same process is employed when using raw caoutchouc or other initial materials. It is only necessary to vary the quantity of the solvents and of the alkali somewhat according to the nature of the material employed.

What I claim is—

1. The process herein described of producing solutions of caoutchouc in strong alkaline aqueous liquids, which consists in dissolving caoutchouc first in one of its well-known solvents, next treating the solution thus obtained with a strong alkaline aqueous liquid, and then subjecting the mixture to the action of steam until the solvent is distilled off from the solution and the caoutchouc is conveyed from the solvent into the aqueous liquid.

2. The process herein described of treating rubber waste, which consists in dissolving rubber waste first in one of the ordinary solvents of caoutchouc, next treating the solution thus obtained with a strong alkaline aqueous liquid, then subjecting the mixture to the action of steam until the solvent is distilled off from the solution and the caoutchouc conveyed from the solvent into the aqueous liquid, then separating the impurities contained in the alkaline solution from the same, and, lastly, precipitating the caoutchouc from the purified solution by means of an acid agent.

3. A solution of caoutchouc, consisting of caoutchouc dissolved in an alkaline liquid.

In testimony that I claim the foregoing as my invention I have signed my name in presence of two subscribing witnesses.

PAUL ALEXANDER.

Witnesses:
HENRY HASPER,
WOLDEMAR HAUPT.